US005503472A

United States Patent [19]
Vu et al.

[11] Patent Number: 5,503,472
[45] Date of Patent: Apr. 2, 1996

[54] METHOD AND APPARATUS FOR ASSEMBLY OF A MULTI-DISK PACK UNIT

[75] Inventors: Tuan T. Vu, Milpitas, Calif.; Mario N. Palmeri, Jr., Nashua, N.H.

[73] Assignee: Sun Microsystems, Inc., Mountain View, Calif.

[21] Appl. No.: 84,826

[22] Filed: Jun. 29, 1993

[51] Int. Cl.$^6$ .................................................. A47B 88/00
[52] U.S. Cl. ....................................... 312/223.2; 361/685
[58] Field of Search ......................... 312/223.2; 361/685, 361/727

[56] References Cited

U.S. PATENT DOCUMENTS

| 4,717,982 | 1/1988 | Toreson et al. . | |
| 5,047,898 | 9/1991 | Cooke et al. | 361/685 |
| 5,306,079 | 4/1994 | Liu | 312/223.2 |
| 5,340,340 | 8/1994 | Hastings et al. | 312/223.1 X |

FOREIGN PATENT DOCUMENTS

| 0421847 | 10/1989 | European Pat. Off. . |
| 0534402 | 9/1991 | European Pat. Off. . |
| 3118154 | 5/1980 | Germany . |

OTHER PUBLICATIONS

IBM Technical Disclosure Bulletin, vol. 32, No. 7, Dec. 1989, New York, US, pp. 32–34, XP78006.

Primary Examiner—James R. Brittain
Assistant Examiner—Gerald A. Anderson
Attorney, Agent, or Firm—Erwin J. Basinski

[57] ABSTRACT

An apparatus and method are disclosed for minimizing the space required for a disk drive housing by mounting a disk drive unit in an enclosure of minimum size, using only a connection on one side of the disk drive and a drive belly plate, which is mounted on the bottom side of the disk drive, connected to an engaging surface on the bottom or intermediate cross-member of the superstructure, whereby the disk drive is held securely. The apparatus may accommodate four 3.5 inch form factor full height disk drives or six 3.5 inch form factor one inch high disk drive units. Additional space savings in the housing are achieved by the use of a unique electrical-connector attachment plate for connecting the cable connector terminals to the housing without the use of the normal connectors such as screws, bolts, etc.

11 Claims, 10 Drawing Sheets

METHOD AND APPARATUS FOR ASSEMBLY OF A MULTI-DISK PACK UNIT

BACKGROUND OF THE INVENTION

1. Field of the Invention

The present invention is related to the field of computer systems. Specifically, the present invention relates to mechanisms in which are mounted disk drive units for use as desktop storage devices.

2. Background of the Invention

At the present time, price performance competition in the computer industry creates pressure on product designers to create lower cost systems which include added capability. Added capability is usually provided through faster processors, expanded memory capacity, and/or increased disk storage capacity, whereas reduced costs in these areas are typically provided through reduced manufacturing costs of these devices. However, additional cost reductions are sometimes also obtained through packaging efficiencies, wherein computer systems become more compact and the related system units become more densely packed with electronic devices. Moreover, computer users acceptance of the desktop workstation concept has added to the design pressures to produce smaller units which are less cumbersome for small work spaces. Having become accustomed to computer monitors and accessories with small footprints, customers are reluctant to accept new units with bigger footprints even though the new box might contain added capability.

In the prior art, disk drive units have normally been seated within a drive housing with secure connections at each side of the disk drive unit. This is because a disk drive unit, by virtue of the rotational pressures of the drive mechanism, normally creates vibrational forces in the plane of the disk when seated in the drive unit. This plane would be the horizontal plane when the disk drive unit is in the upright position. These vibrational forces are therefore normally dampened by securely fastening both sides of the drive unit to the housing or to the mounting structure. As a result, the need to fasten both sides of the drive unit normally requires enough room within the housing to fasten drive units stacked one on top of another, with room on both sides to insert fasteners (i.e. screws, bolts, connectors, etc.) to connect the drive unit to the holding structure. Other mounting schemes which have permitted two drives to be mounted side by side, include disk drive unit mounting mechanisms with slide-out arms to which the sides of a drive unit can be fastened, and the drive unit then inserted into the drive unit holder, with the slide-out arms of the second holder extracted and the second drive connected to the arms on each side of the drive and the second drive unit then inserted into the drive holder. This type of side-by-side arrangement requires enough space in the plane of the two drive units to accommodate the width of the two drive units, the width of the slide-out arms, connectors (i.e. screws, etc) on two sides of each drive, and on each side of each drive unit, the width of channel guides or other similar mechanisms in which the the slide-out arms would ride/travel. From an assembly time standpoint, this latter process requires time to fasten each side of each drive, slip them back in to the holding mechanism and lock each drive in place. Moreover, the disk drive housing mechanism must also normally have enough room to easily accommodate the related power units, cooling-fan and adequate room for the associated cables and cable connectors to be attached to the housing.

Today the pressure to produce computer monitor and accessory enclosures of small size and yet with added functions, which can be efficiently assembled, creates the need for innovative packaging and assembly concepts. The present invention is an apparatus and method for assembling a plurality of disk drive units into a single enclosure of minimal size, with minimal effort, thereby minimizing the packaging cost and module footprint size while meeting all required vibration standards.

SUMMARY OF THE INVENTION

An apparatus and method are disclosed for mounting a plurality of disk drive units in an enclosure of minimum size, using only a connection on one side of the disk drive and a drive belly plate, which is mounted on the bottom side of the disk drive, connected to an engaging surface on the bottom or intermediate cross-member of the drive mounting super-structure, whereby the disk drive is held securely and with minimal clearance between the adjacent sides of two drive units mounted side-by-side. The apparatus may accommodate four 3.5 inch form factor full height disk drives or six 3.5 inch form factor one inch high disk drive units.

The disk drive housing apparatus contains a super-structure into which the disk drives are mounted, each disk drive unit being connected only by a connection on one side of the disk drive unit and by a connector plate attached to the bottom of each disk drive unit which is fashioned to securely engage connecting slots and tabs on each bottom and intermediate cross-member of the super-structure.

An electrical connector plate assembly for securely attaching the disk drive unit cable connectors to the rear of the disk drive housing without the use of screws which thereby also reduces the space needed within the disk drive unit enclosure is also disclosed. The electrical connector plate assembly is securely held in the seated position by locking tabs attached to the inside rear of the top member of the housing, which makes abutting contact with the seating restraint tabs on the top edge of the connector attachment plate when the top member of the housing is connected to the bottom housing member.

Also disclosed are methods for assembling the disk drive housing device and for connecting the drives to the super-structure and for connecting the electrical connectors to the housing.

DESCRIPTION OF THE DRAWINGS

The objects, features and advantages of the system of the present invention will be apparent from the following description in which.

DESCRIPTION OF THE PREFERRED EMBODIMENT

A method and apparatus for mounting multiple disk drive units in a limited space enclosure are disclosed, which meet the International Electrotechnical Commission ("IEC") 69 and 721 series of test standards, and which requires connections only on the side and bottom of the individual drive units. In the following description for purposes of explanation, specific numbers, materials, and configurations are set forth in order to provide a thorough understanding of the present invention. However, it will be apparent to one skilled in the art that the present invention may be practiced without the specific details.

Figure 1:
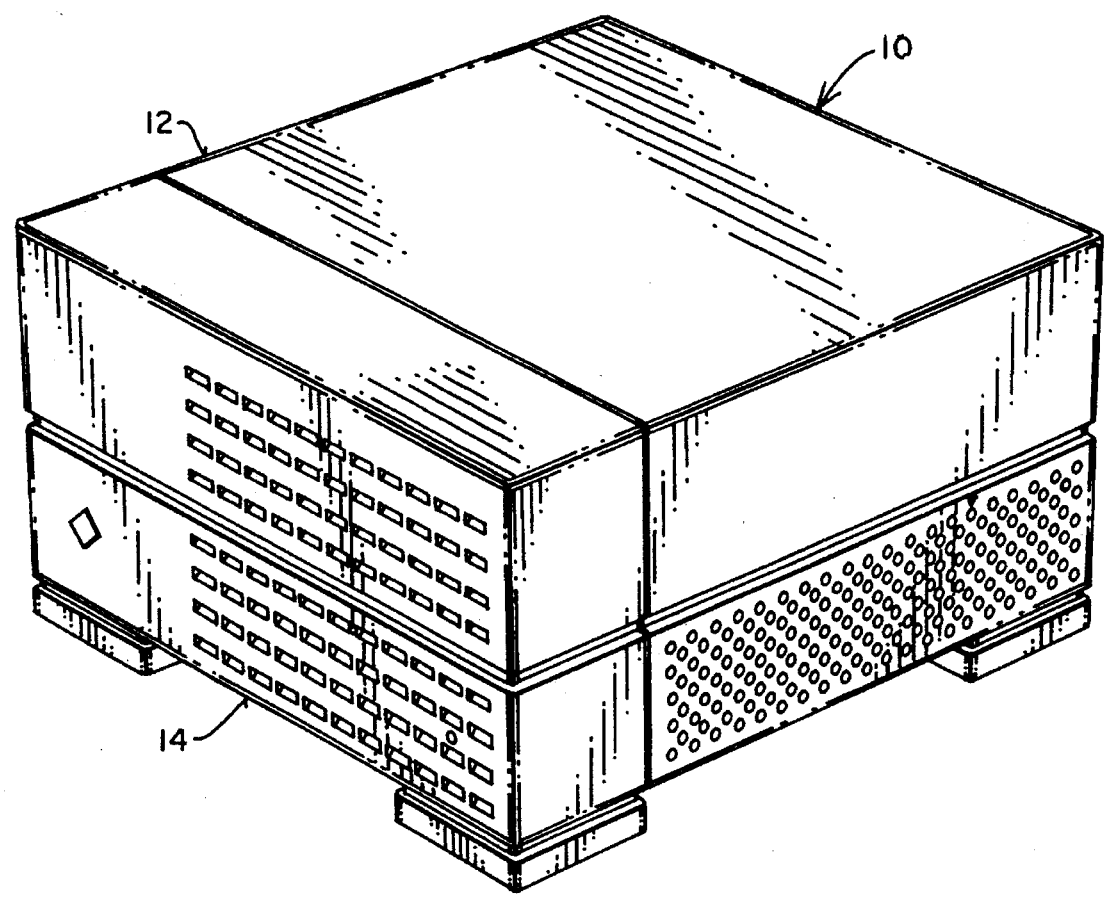
FIG. 1 illustrates a general purpose multi-disk drive enclosure.
Figure 2:
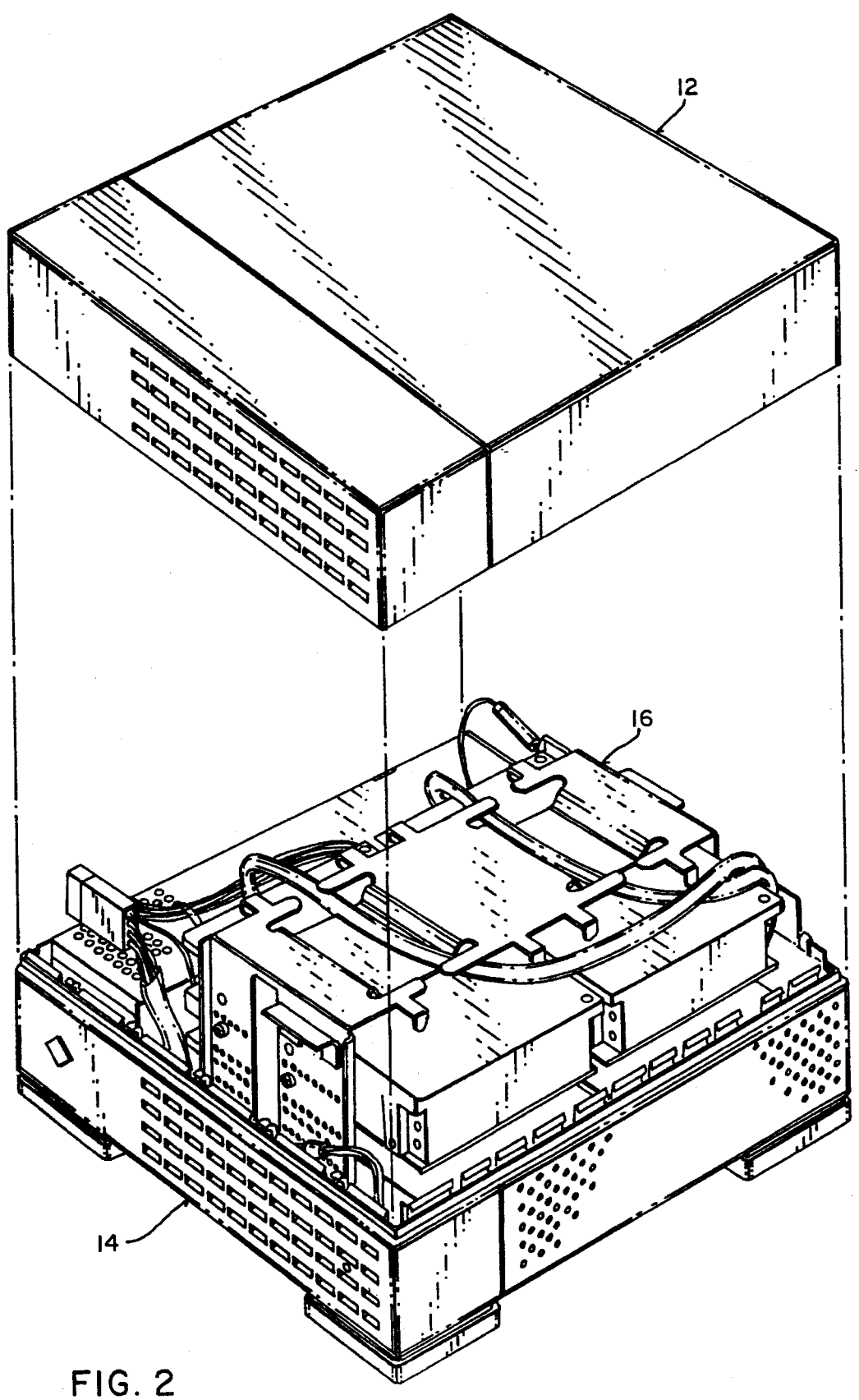
FIG. 2 illustrates the general positioning of the super-structure within the drive enclosure.

Referring now to FIG. 1, a general purpose multi-disk drive enclosure is illustrated. In the preferred embodiment, the enclosure 10 is a parallelepiped box approximately 144 millimeters tall, by 244 millimeters wide, by 264 millimeters deep. The enclosure 10 has a top enclosure member 12 and a bottom enclosure member 14. FIG. 2 shows the disk drive enclosure 10 with the top enclosure member 12 removed to expose the super-structure 16. Such multi-disk drive enclosures may be of any size, however the present invention is designed to minimize the footprint of the enclosure as well as the height of the box in order to make it stackable over previously released products, while using existing components in order to minimize cost. The footprint of a device is the area of desk or floor space occupied by the device.

Figure 3:
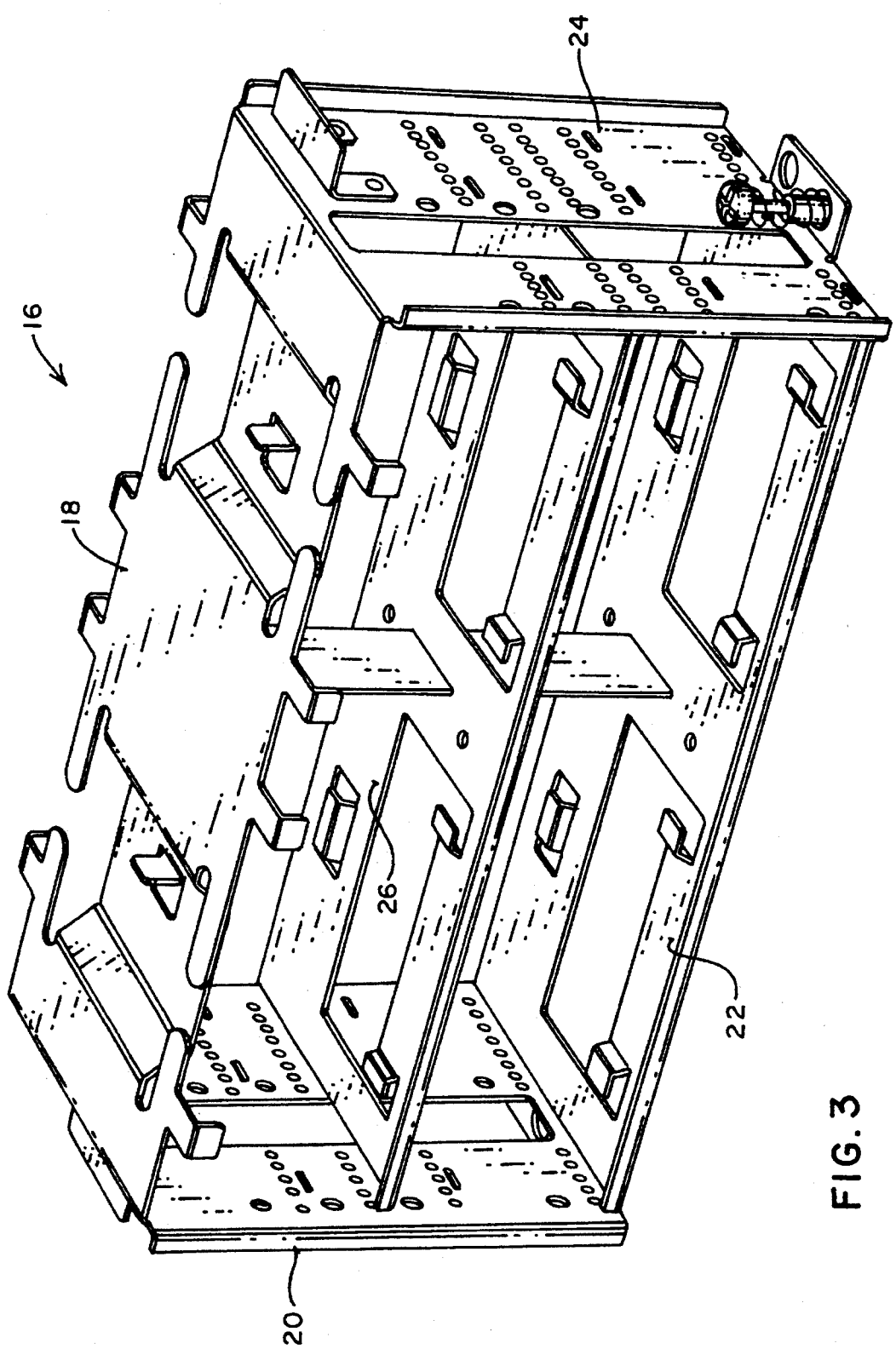
FIG. 3 illustrates the super-structure in perspective view.

Referring now to FIG. 3, the super-structure 16 is shown in perspective view, and is comprised of a top member 18, a bottom cross-member 22, and an intermediate cross-member 26 which are essentially parallel to each other, and side members 20,24 which are substantially perpendicular to top member 18, bottom cross-member 22 and intermediate cross-member 26. In this exemplary configuration with only two cross-members 22 and 26, the super-structure 16 can accommodate four 3.5 inch form factor, full height disk drive units. An alternative configuration would include three cross-members (one 22, and two 26s), within the same size super-structure to accommodate six 3.5 inch form factor, 1 inch high disk drive units.

Figure 4:
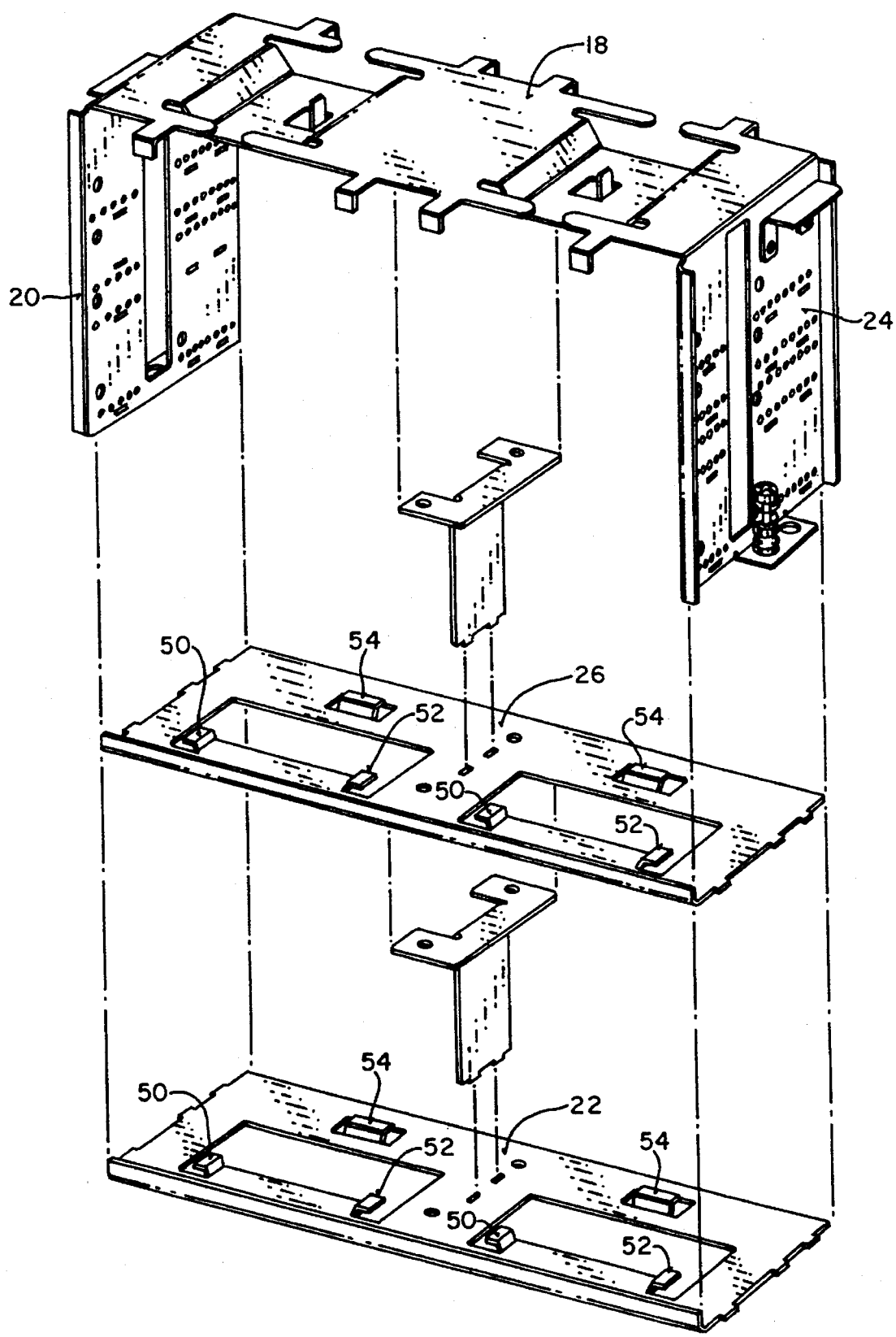
FIG. 4 illustrates the super-structure in exploded view.
Figure 5:
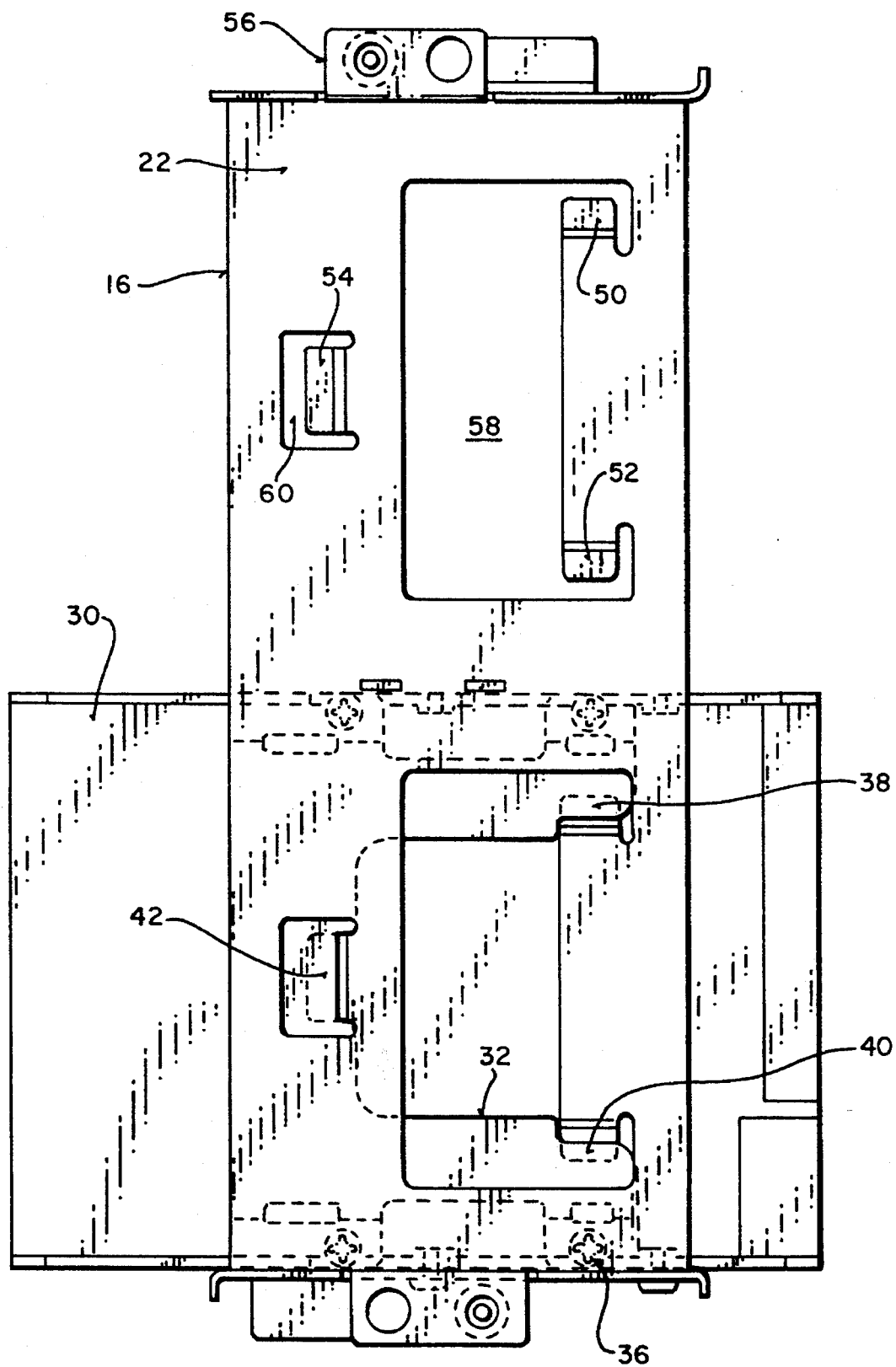
FIG. 5 illustrates the bottom view of the super-structure showing a mounting bracket and illustrating a mounted disk drive.
Figure 6:
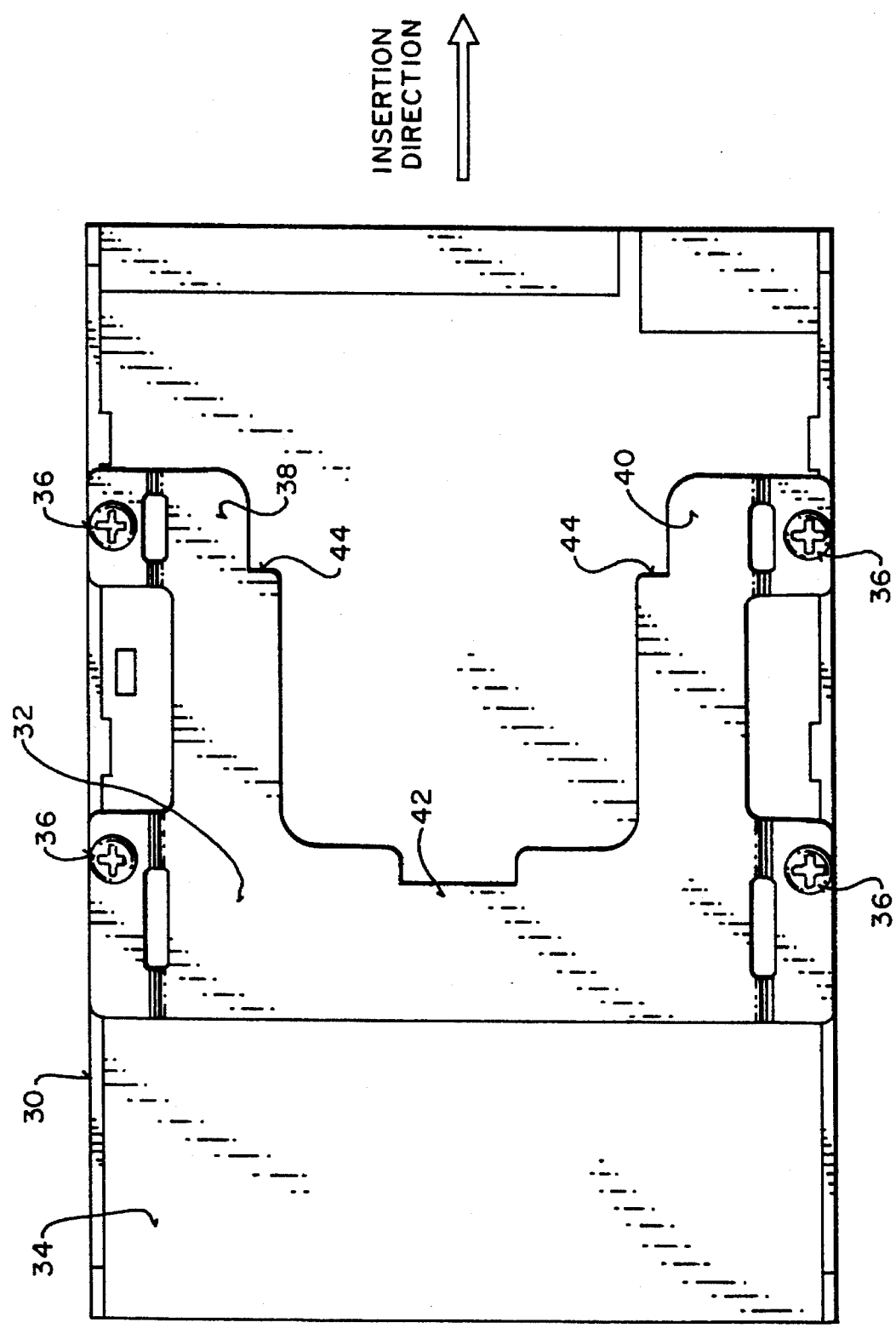
FIG. 6 illustrates the drive belly plate.

FIG. 4 illustrates the super-structure 16 in exploded view in a preferred configuration, showing the mounting areas on the bottom cross-member 22 and the intermediate cross-member 26. Each mounting area has a clip finger 54 and a left holding tab 50 and a right holding tab 52 for securely holding the drive belly plate 32 (see FIG. 8) which is mounted on the bottom of a disk drive as illustrated below. In the preferred embodiment, the side members 20 and 24 are an integral part of the top member 18, the side members being bent downward at a 90 degree angle to the top member. FIG. 5 illustrates a bottom view of the super-structure 16 showing a disk drive 30 seated on one side of the bottom member 22 and an open slot on the other side of the bottom member 22. On this open slot side, the openings 58, 60 and the clip finger 54 and a left holding tab 50 and a right holding tab 52 are illustrated. These holding tabs 50,52 and the holding finger 54 are used to hold down the disk drive 30 by engaging the clip plate 42 and the left holding area 38 and right holding area 40 on the drive belly plate 32 which is attached to the bottom of the disk drive 30. The drive belly plate 32 is shown more clearly in FIG. 6, which illustrates the plate 32 connected to the bottom 34 of a disk drive 30. The plate 32 is secured to the disk drive 30 by means of four hex screws 36, two on either side. The drive belly plate 32 has a clip plate 42 area for engaging the clip finger (54 in FIG. 5), a left holding area 38 and a right holding area 40 for engaging the holding tabs (50, 52 in FIG. 5) on the super-structure bottom or intermediate cross-members. The notch 44 on the drive belly plate 32 is used to correctly position the drive in the super-structure drive slot.

Figure 7:
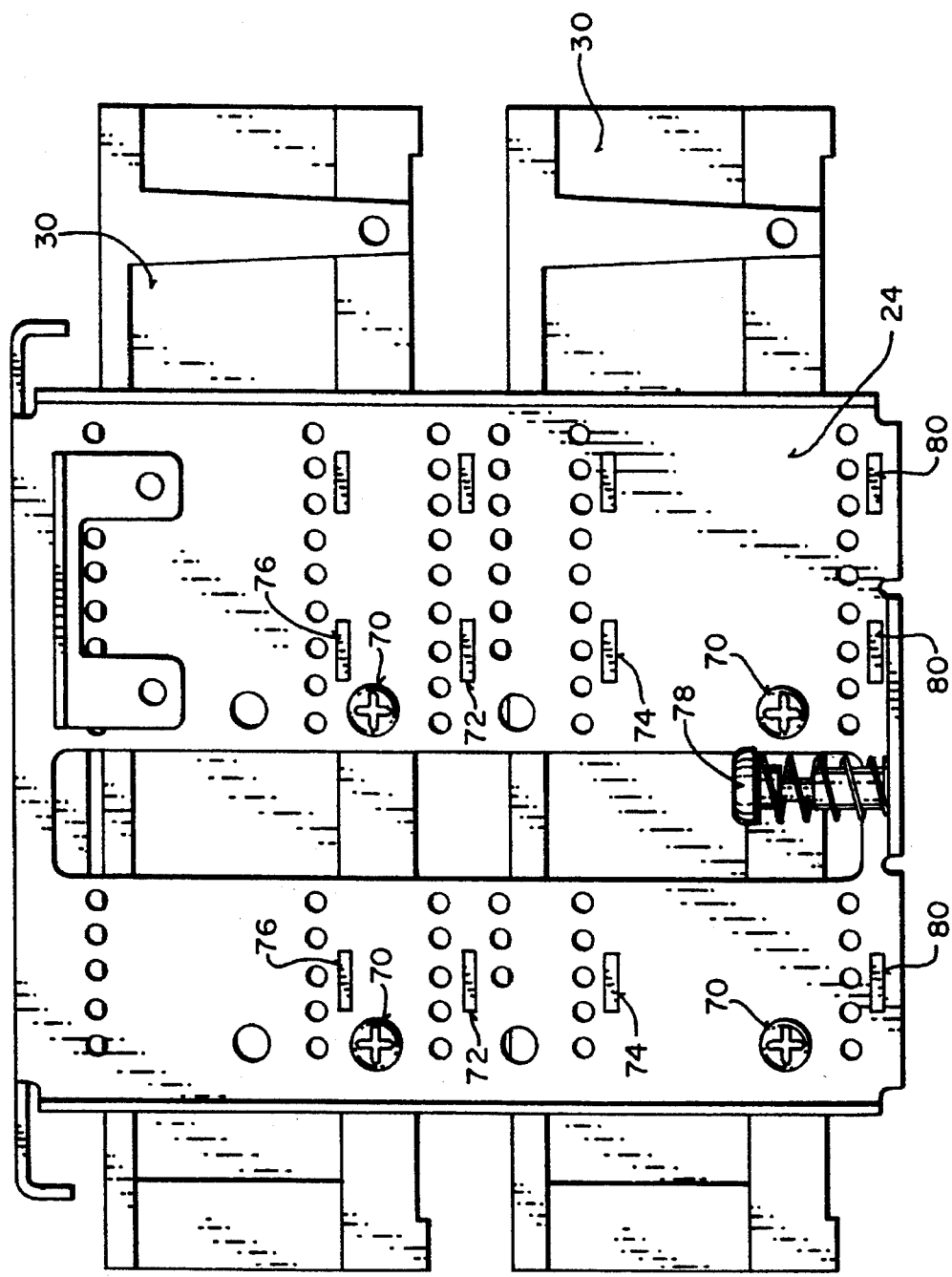
FIG. 7 illustrates a side member of the super-structure.

Referring now to FIG. 7, the detail of a side member 24 of the super-structure is illustrated. A four drive configuration is illustrated with the side perspective showing two disk drives 30, one mounted on the bottom cross-member (not shown) and one drive mounted on the intermediated cross-member (not shown). Each drive is attached to the side member 24 by means of two hex screws 70. The bottom cross-member is attached to the side member 24 by means of the bottom connecting slots 80. In the four drive configuration shown, the intermediate cross-member is connected to the side member 24 by means of the middle connecting slots 72. An alternate embodiment, which would house six 3.5 inch form factor 1 inch high disk drives (three on each side of the structure) would use two intermediate cross-members, one mounted in the upper connecting slots 76, and the other mounted in the lower connecting slots 74. Those skilled in the art will recognize that other configurations are possible using the same attachment schemes. Moreover it is important to understand that, in the preferred embodiment each drive is held securely in the super-structure by only the two hex nuts 70 on one side of the drive and the belly plate 32 on the bottom of the drive. This allows a minimum clearance between drives which are attached to the same cross-member, and yet provides adequate structural rigidity for proper drive functioning. In the preferred embodiment, the clearance between drives on the same plane is two millimeters (90 in FIG. 8).

Figure 8:
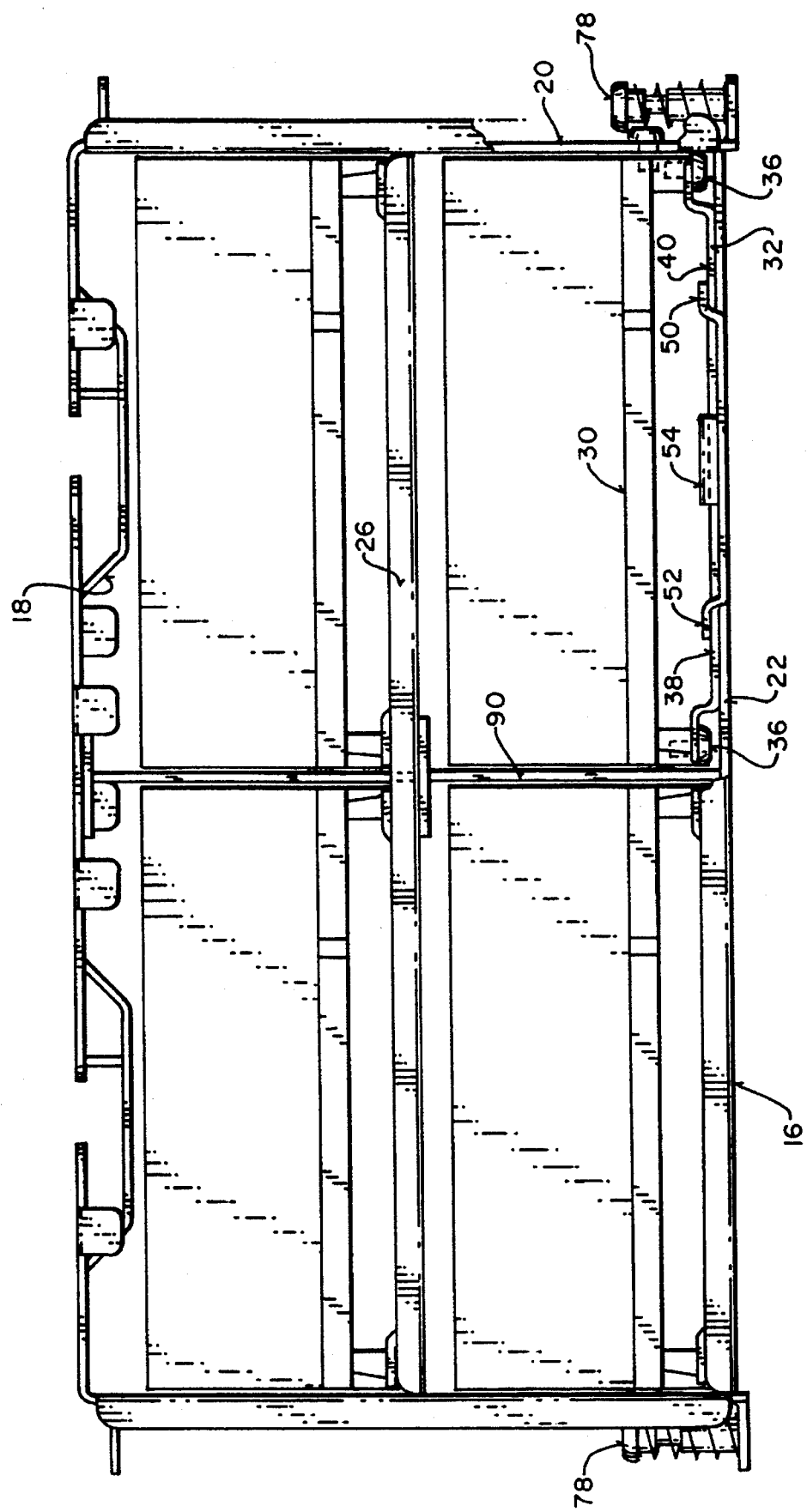
FIG. 8 illustrates a front view of the super-structure.

Referring now to FIG. 8, a front view of the super-structure 16 is shown illustrating the four drive configuration. Illustrated are the bottom cross-member 22, the intermediate cross-member 26 and the top member 18. Hold down connectors 78 are used to connect the super-structure 16 to the disk drive enclosure. The lower right disk drive 30 is shown connected to the bottom member 22. A drive belly plate 32 is shown connected to the disk drive 30 by means of the belly plate connecting hex screws 36, and with the left holding area 38 and a right holding area 40 on the belly plate 32, engaging the holding tabs 52 and 50. FIG. 8 also illustrates the narrow clearance 90 between adjacent drives in this configuration. In the preferred embodiment this clearance is approximately two millimeters. Obviously this clearance does not permit a securing screw to be used to hold the inner side of the drive. It is for this reason that the utility of the drive belly hold down plate 32 and the screw connections on the outer side of the drive (70 in FIG. 7) provide a clever and secure vibration free mounting for the disk drives, while minimizing the lateral distance from one side member to the other and while also simplifying the assembly time. Alternative configurations of side-by-side disk drive mounts can be envisioned which similarly require no connectors on the sides of the drives which are adjacent to each other and which simplify the assembly process.

In the preferred embodiment the super-structure device is fabricated from zinc plated CRS material.

Disk drives such as those used in this invention are normally electrically connected to other parts of a computer system by means of cables which terminate in Small Computer System Interface (SCSI) connectors. Such connectors would normally be mounted on the inside rear of the disk drive enclosure by means of standard screws. However, in the preferred embodiment, there is inadequate space between the super-structure 16 and the rear of the bottom enclosure member 14 to insert the fingers to hold a screw or a holding tool to secure the disk drive SCSI connectors to the bottom enclosure member 14 with screws as is normally done. Accordingly, an innovative SCSI connector clip mechanism, which requires no direct screw connection to the disk drive enclosure also forms a part of this invention.

Figure 9:
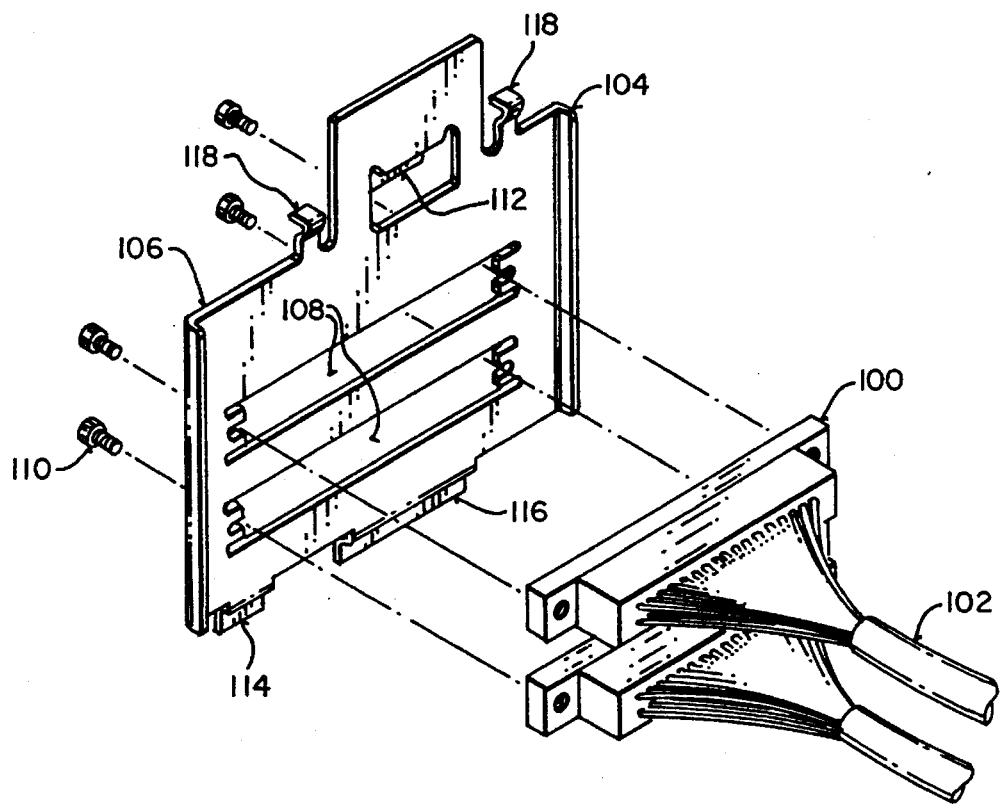
FIG. 9 illustrates an exploded view of the SCSI connectors and the SCSI attachment plate.

FIG. 9 illustrates the connection of the SCSI connectors 100 of the cables 102 from the disk drives 30 to a SCSI attachment plate 104. The SCSI attachment plate 104 comprises a vertical member 106 having apertures 108 into which the SCSI connectors may be attached by hex screws 110, the vertical member 106 having a clip finger 112 at the top, having holding tabs 114 and 116 at its foot, and seating restraint tabs 118 also on the top portion of the attachment plate. The SCSI connectors can be easily attached to this SCSI attachment plate either before the super-structure is attached inside the drive enclosure or afterward, since the attachment plate is not connected to anything at this point.

Figure 10:
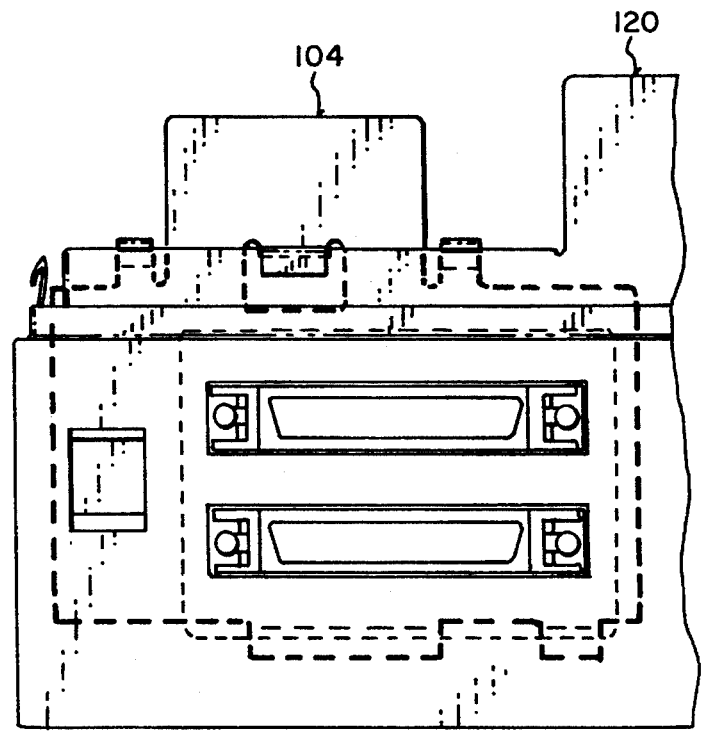
FIG. 10 illustrates a front view of the SCSI attachment holder with the SCSI attachment plate.
Figure 11:
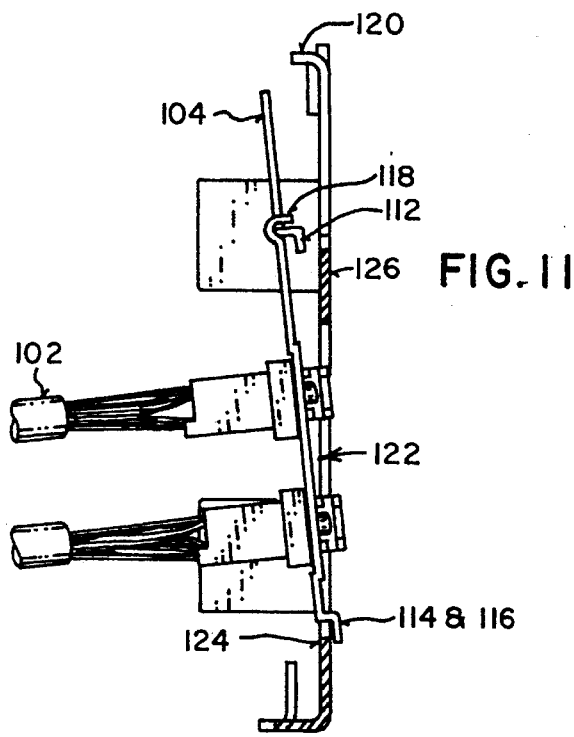
FIG. 11 illustrates a side view of the method of inserting the SCSI attachment plate into the attachment holder.
Figure 12:
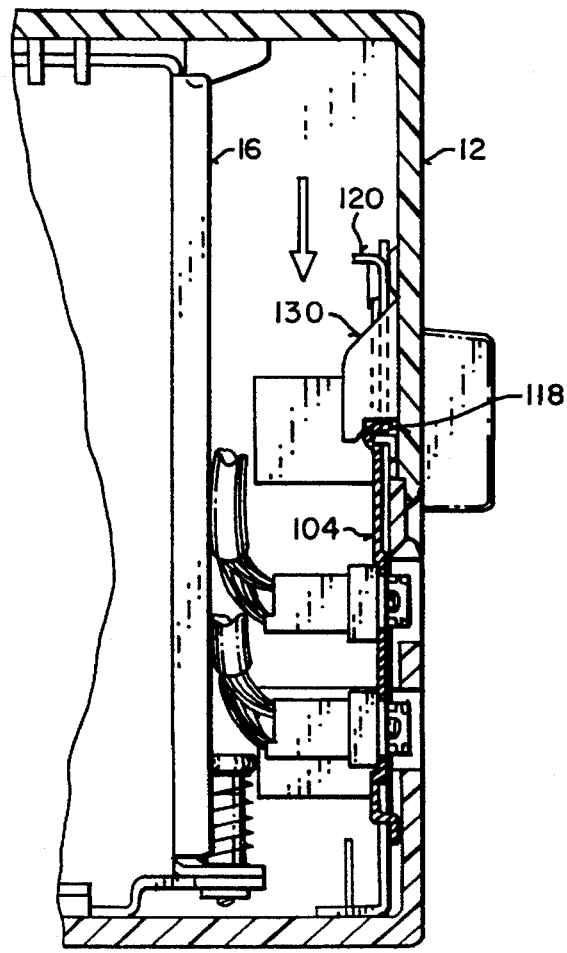
FIG. 12 illustrates a side view of the SCSI attachment plate and attachment holder as held in place by the top of the disk drive enclosure.

FIG. 10 illustrates the SCSI attachment plate 104 and its relationship to a SCSI attachment plate holder 120. The SCSI attachment plate holder 120 is attached to the inside rear of the bottom enclosure member 14 as shown in FIG. 12. FIG. 11 provides a side view of the SCSI attachment plate 104 with cables 102 attached and illustrating the method of connecting the SCSI attachment plate 104 to the plate holder 120. Holding tabs 114 and 116 are inserted into the aperture 122 for seating on the bottom lip 124 on the aperture 122 in the plate holder 120. Clip finger 112 is connected to the top portion 126 of the plate holder 120 and seating restraint tabs 118 extend over the top portion 126 of plate holder 120.

Referring now to FIG. 12, a pair of locking tabs 130 connected to the inside rear of the top enclosure member 12, are used to provide abutting contact to the seating restraint tabs 118, to firmly lock the SCSI attachment plate 104 to the SCSI attachment plate holder 120 and thereby to the disk drive enclosure without the need for any screw attachment to the enclosure itself.

Although the SCSI connector mechanism has been described in connection with a two cable hook-up, it should be apparent to those skilled in the art that the SCSI connector mechanism architecture may be applied to other configurations of SCSI connectors and to other types of electrical connectors and that the disk drive mounting architecture described can be used in other environments and other configurations without violating the letter or spirit of the claims which follow.

What is claimed is:

1. A disk drive housing apparatus comprising:
   a disk drive enclosure having a top member and a bottom member;
   a super-structure situated within said enclosure, having a top cross-member, a bottom cross member, one or more intermediate cross-members, said top, bottom and intermediate cross-members being parallel to each other and being connected to side members which are substantially parallel to each other and being connected to side members which are substantially perpendicular to said top, bottom and intermediate cross-members, for receiving and supporting a disk drive unit therein, each of said bottom and intermediate cross-members having mounting brackets for holding said disk drive unit;
   a drive belly plate for remountably engaging one of said mounting brackets, said drive belly plate being demountably connected to said disk drive unit; and
   connecting mechanisms for demountably connecting said disk drive unit to one of said side members after said disk drive has been inserted into said support structure with said drive belly plate engaged to one of said mounting brackets,
   whereby said disk drive is held securely in said super-structure being secured by said connecting mechanisms on one side and said belly plate.

2. A disk drive housing apparatus comprising:
   an electrical-connector attachment plate connected to said disk drive housing, and with said disk drive unit being attached to wiring cables, said cables being attached to electrical-connectors and said electrical-connectors being attached to said electrical-connector attachment plate assembly;
   an electrical-connector attachment plate comprising a vertical member having apertures into which said electrical-connectors can be attached, said vertical members also having a clip finger and seating restraint tabs on a top edge and having holding tabs on a bottom edge;
   an electrical-connector attachment plate holder which is connected to a back end section of said disk drive housing apparatus, said electrical-connector attachment plate holder having an aperture into which said holding tabs on a bottom edge of said vertical member may be inserted and seated on a bottom edge of said aperture, and wherein said clip finger on a top edge of said vertical member may be seated on a top edge of said electrical-connector attachment plate holder; and
   a top member of said disk drive housing containing a pair of locking tabs located on an inside face of a rear portion of said top member of said disk drive housing, said locking tabs providing abutting contact with said seating restraint tabs on a top edge of said electrical-connector attachment plate to lock said electrical-connector attachment plate in place when said top member of said disk drive housing is affixed to a bottom member of said disk drive housing containing said electrical-connector attachment plate assembly.

3. A disk drive housing apparatus comprising:
   a super-structure comprising:
      a top cross-member;
      a bottom cross-member and one or more intermediate cross-members, said bottom and intermediate cross-members being substantially parallel to said top cross-member, and said bottom and intermediate cross-members having connecting mechanisms for demountably engaging a disk drive unit; and
      side members connected to said top, bottom and intermediate cross-members and said side members being substantially perpendicular to said top, bottom and intermediate cross-members;
   said super-structure situated within a disk drive housing in which a disk drive unit can be mounted, a disk drive unit being connected to said super-structure by connector mechanisms on one side of said disk drive unit and by a connector plate on a bottom of said disk drive unit, said connector plate comprising:

a drive belly plate for demountably engaging one of said cross-member connecting mechanisms, said drive belly plate being demountably connected to a disk drive unit; and said connector mechanisms comprising:

connecting devices for demountably connecting a disk drive unit to one of said side members after said disk drive unit has been inserted into said super-structure with said drive belly plate engaged to one of said cross-member connecting mechanisms, whereby said disk drive is held securely in said enclosure being secured by said connecting devices on one side and said drive belly plate.

4. The disk drive housing apparatus set forth in claim 3 wherein said super-structure can hold up to four disk drive units.

5. The disk drive housing apparatus set forth in claim 4 wherein said four disk drive units are 3.5 inch form factor full height disk units.

6. The disk drive housing apparatus as set forth in claim 3 wherein said super-structure comprises two intermediate cross-members and can hold up to six disk drive units.

7. The disk drive housing apparatus as set forth in claim 6 wherein said six disk drive units are 3.5 inch form factor one inch high disk units.

8. The disk drive housing apparatus as set forth in claim 3 further comprising an electrical-connector attachment plate assembly connected to said disk drive housing, said cables being attached to electrical-connectors and said electrical-connectors being attached to said electrical-connector attachment plate assembly.

9. The disk drive housing apparatus as set forth in claim 8 wherein said electrical-connector attachment plate assembly comprises:

an electrical-connector attachment plate comprising a vertical member having apertures into which said electrical-connectors can be attached, said vertical member also having a clip finger and seating restraint tabs on a top edge of said vertical member and having holding tabs on a bottom edge of said vertical member.

10. The disk drive housing apparatus as set forth in claim 9 wherein said electrical-connector attachment plate assembly further comprises an electrical-connector attachment plate holder which is connected to a back end section of said disk drive housing apparatus, said electrical-connector attachment plate holder having an aperture into which said holding tabs on a bottom edge of said vertical member may be inserted and seated on a bottom edge of said aperture, and wherein said clip finger on a top edge of said vertical member may be seated on a top edge of said electrical-connector attachment plate holder.

11. The disk drive housing apparatus as set forth in claim 10 wherein a top member of said disk drive housing contains a pair of locking tabs located on an inside face of a rear portion of said top member of said disk drive housing, said locking tabs providing abutting contact with said seating restraint tabs on a top edge of said electrical-connector attachment plate to lock said electrical-connector attachment plate in place when said top member of said disk drive housing is affixed to a bottom member of said disk drive housing containing said electrical-connector attachment plate assembly.

* * * * *